United States Patent [19]

Rosback

[11] 3,878,128

[45] Apr. 15, 1975

[54] METHOD FOR MANUFACTURING AN ADSORBENT USEFUL FOR OLEFIN SEPARATION

[75] Inventor: Donald H. Rosback, Elmhurst, Ill.

[73] Assignee: Universal Oil Products Company, Des Plaines, Ill.

[22] Filed: Sept. 28, 1973

[21] Appl. No.: 401,782

[52] U.S. Cl................ 252/455 Z; 208/310; 423/112
[51] Int. Cl............................................. B01j 11/40
[58] Field of Search................ 252/455 Z; 208/310; 423/112

[56] References Cited
UNITED STATES PATENTS

| | | | |
|---|---|---|---|
| 3,354,078 | 11/1967 | Miale et al. ...................... | 252/455 Z |
| 3,375,065 | 3/1968 | McDaniel et al................ | 252/455 Z |
| 3,717,572 | 2/1973 | de Gramont et al................ | 208/310 |

Primary Examiner—C. Dees
Attorney, Agent, or Firm—James R. Hoatson, Jr.; Thomas K. McBride; William H. Page, II

[57] ABSTRACT

A method for the production of a solid adsorbent useful in the separation of olefins from a hydrocarbon feed mixture comprising olefins and paraffins. The method basically comprises the steps of: contacting a base material comprising type X or type Y structured zeolite with a fluoride-containing solution of sodium hydroxide to effect the addition of alkali metal cations to and the extraction of alumina from the base material; washing the material at washing conditions until substantially free of sodium hydroxide; and drying the treated base material at conditions to reduce the LOI at 900°C. to less than about 10 wt. %. The combination fluoride-caustic treatment produces a superior adsorbent for separating olefins from a hydrocarbon feed mixture comprising olefins and paraffins. The adsorbent produced has increased capacity for olefins, decreased catalytic activity and reduced dustiness.

13 Claims, No Drawings

METHOD FOR MANUFACTURING AN ADSORBENT USEFUL FOR OLEFIN SEPARATION

BACKGROUND OF THE INVENTION

1. Field of the Invention

The field of art to which this invention pertains is crystalline aluminosilicate production. More specifically, this invention relates to a method of modifying the characteristics of a base material comprising type X or type Y zeolite to produce an absorbent having characteristics desirable for separating olefins from a hydrocarbon feed mixture containing olefins.

2. Description of the Prior Art

There are numerous methods for the manufacture and ion-exchange of various crystalline aluminosilicates, particularly the type X and type Y crystalline aluminosilicates, the yield products useful for effecting given hydrocarbon reactions or separations. In the method of this invention, a manufacturing method has been discovered whereby an adsorbent material is produced having superior properties for the separation of olefins from a feed mixture comprising olefins and paraffins.

A common problem encountered with most adsorbents and many catalysts is dust which can form excessive pressure drop after the adsorbent or catalyst has been loaded into the adsorbent chambers or reaction vessel. Certainly it is for this reason that adsorbents and catalysts are manufactured to meet certain minimum physical strength requirements and that they are loaded into chambers and vessels with care to avoid breakage. Although operations such as screening can be used to remove most of the interstitial smaller particles and dust, such operations generally fail to remove dust which may coat particles of adsorbent or catalyst of the proper size. This type of dust, apparently held to the particle by electrostatic attraction, may then later be removed by liquid passing through the adsorbent chamber or catalyst vessel and accumulate to form excessive pressure drops.

I have discovered that the troublesome dustiness characteristic of adsorbents is virtually eliminated by a fluoride treatment of the base material. It is thought that the fluoride solublizes the dust by reacting with combined aluminum compounds present in the dust thereby removing the dust from the particles.

A particular problem often encountered when using an adsorbent to separate olefins from a hydrocarbon feed mixture is that the absorbent tends to catalyze isomerization and polymerization of the feed olefins. Polymer produced blocks the pores of the adsorbent thereby reducing the effectiveness of the adsorbent.

In the method of my invention I have additionally found that ion-exchanging of a base material comprising type X or type Y zeolite with a fluoride-containing aqueous solution of sodium hydroxide followed by washing at washing conditions until substantially free of sodium hydroxide and drying at drying conditions to reduce the volatile content produces an adsorbent with increased capacity for olefins and decreased catalytic activity. Furthermore, we have found that catalytic activity of the finished adsorbent decreased in proportion to the amount of the cation added to the zeolite by the caustic treatment. The cation added by the ion exchange apparently replaces acid sites within the zeolite that catalyze isomerization and polymerization reactions.

By the method of my invention therefore an adsorbent especially suited for olefin separation is produced having both increased capacity for olefins and decreased catalytic activity as well as reduced dustiness. The adsorbent produces is more efficient for olefin separation because of this increased capacity and has a longer effective life because of its reduced catalytic activity and reduced dustiness.

SUMMARY OF THE INVENTION

It is an object of the present invention to provide a method for the manufacture of a zeolitic adsorbent which method employs a type X or type Y structured zeolite as an intregal component of the finished adsorbent. It is another object of the present invention to provide a method for the manufacture of an adsorbent which has superior properties when used for the separation of olefins from a hydrocarbon feed mixture. It is a further object of this invention to provide an improved process for the separation of olefins from hydrocarbon feed mixture.

In brief summary, my invention is, in one embodiment, a method of manufacturing a solid adsorbent useful for the separation of olefins from a feed mixture comprising olefins and paraffins which method comprises the steps of: (a) contacting a base material containing type X and type Y zeolite with a fluoride-containing solution of sodium hydroxide solution at ion-exchange conditions to effect the addition of sodium cations to and the extraction of alumina from the base material; (b) washing the ion exchange material at ion exchange conditions until substantially free of sodium hydroxide; and (c) drying the resulting exchanged mass at drying conditions to reduce the LOI at 900° C. to less than about 10 wt. %.

Other embodiments and objects of the present invention encompass further details such as operating conditions of various steps of the method all of which are hereinafter disclosed in the following discussion of each of these facets of the invention.

DESCRIPTION OF THE INVENTION

The type X and type Y crystalline aluminosilicates or zeolites herein contemplated are described as a three-dimensional network of fundamental structural units consisting of silicon-centered $SiO_4$ and aluminum-centered $AlO_4$ tetrahedra interconnected by a mutual sharing of apical oxygen atoms. The space between the tetrahedra is occupied by water molecules and subsequent dehydration or partial dehydration results in a crystal structure interlaced with channels or molecular dimension.

The type X structured and type Y structured zeolite as used in this specification shall include crystalline aluminosilicates having such three dimensional interconnected structures and as specifically defined by U.S. Pat. Nos. 2,882,244 and 3,130,007. The term "type X structured" and "type Y structured" zeolites shall include all zeolites which have a general structure as represented in the above cited patents.

The type X structure zeolite in the hydrated or partially hydrated form has the general empirical formula as shown in Formula 1 below:

FORMULA 1

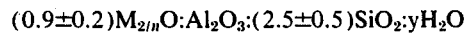

where M represents at least one cation having a valence of not more than 3, $n$ represents the valence of M and $y$ is a value up to about 8 depending upon the identity of M and the degree of hydration of the crystal. The cation M may be one or more of a number of cations such as the hydrogen cation, the alkali metal cations, or the alkaline earth cations or other selected cations and is generally referred to as an exchangeable site.

The type Y structure zeolite in the hydrated or partially hydrated form can be represented in terms of the mole oxides for the sodium form as represented by Formula 2 below:

FORMULA 2

$(0.9\pm0.2)Na_2O:Al_2O_3:wSiO_2:yH_2O$ where $w$ is a value of greater than about 3 up to 8, and $y$ may be any value up to about 9.

The term "type X zeolite" and "type Y zeolite" as employed herein shall refer not only to type X structured and type Y structured zeolites containing sodium cations but to those containing other cations such as the hydrogen cations, the alkali metal cations, or the alkaline earth cations. Typically both the type X and type Y structured zeolites as initially prepared are predominantly in the sodium form but they may contain, possibly as impurities, the other cations as mentioned above.

The term "base material" as used herein shall refer to a type X or type Y zeolite-containing starting material used to make the final adsorbent by the method of this invention. Usually such base material will be predominantly in the sodium form of the zeolite. Generally the base material will be in the form of particles such as extrudates, aggregates, tablets, pills, macro-spheres, or granules producing by grinding any of the above to a desired size range. The type X or type Y zeolite can be present in the base material in concentrations generally ranging from about 75 wt. % to about 90 wt. % of the base material based on a volatile free composition. The remaining material in the base material generally comprises amorphous silica or alumina or both which is present in intimate mixture with the zeolite material. This amorphous material may be an adjunct of the manufacturing process of the type X or type Y zeolite (for example, intentionally incomplete purification of the zeolite during its manufacture) or it may be added to the relatively pure zeolite to aid in forming particles of the zeolite.

A specific base material is commercially available nominal 1/16-inch extrudate comprising 13X zeolite and a minor amount of amorphous material as binder. This base material is primarily in the sodium form; that is, the cation represented as M in formula 1 above is primarily sodium. By chemical analysis the $Na_2O/Al_2O_3$ ratio is usually about 0.7 or less and can typically be about 0.6 or less which, it should be noted, is less than the $0.9\pm0.2$ indicated in Formula 1 above. Other cations such as H+ and any of the Group IIA metal cations may be present, primarily as impurities, to supply the remainder of the cations needed for chemical balance. The silica to alumina ratio of this starting material by X-ray determination is about 2.5 and the same ratio by chemical analysis is about 2.6. Normally the starting material whether in the extrudate or pellet form is granulated to a particular size range of about 20–40 mesh (U.S. Standard Mesh) before the first ion exchange step is begun. This is approximately the desired particle size of the finished adsorbent.

The treatment step with a fluoride-containing sodium hydroxide solution is primarily an ion exchange step in which sodium cations replace non-sodium cation impurities in the zeolite-containing base material thereby essentially eliminating the catalytic activity of the zeolite. Although mild ion exchange conditions are employed, this step additionally removes a small amount of silica and alumina thereby increasing the capacity of the material for olefins and essentially eliminating the dustiness characteristic of the final adsorbent. It is thought that the fluoride solubilizes the dust by reacting with combined aluminum compounds present thereby removing the dust from the particles. Total silica and alumina removal from the precursor mass is from about 1 up to about 15% and is generally in the range of 1 to 5%. Analyses indicate that the bulk of both soluble and insoluble material removed from the base material is aluminum, as alumina or sodium aluminate. At least a portion of the alumina extracted appears to be from the zeolite itself rather than from any amorphous material since there is some nominal loss of zeolite as detected by X-ray analysis after this step. It is not known whether the small amount of silica removed from the base material came from the crystalline (zeolite) portion or the amorphous portion of the base material.

I have found not only that this ion exchange step significantly reduces catalytic activity but specifically that the amount of activity reduction is proportional to the amount of sodium cation contained by the finished adsorbent. This relationship, with the amount of sodium expressed as the ratio $Na_2O/Al_2O_3$, is indicated in Table 1 below. Catalytic activity, by a method hereinafter described, was determined for a base material comprising 13X zeolite and for various adsorbents, each having a different $Na_2O/Al_2O_3$ ratio, prepared from the base material.

Table 1

Relationship Between $Na_2O/Al_2O_3$ and Catalytic Activity

| Adsorbent | | $Na_2O/Al_2O_3$ | Catalytic Activity (Dimer Units) |
|---|---|---|---|
| 13X | starting material | .61 | 55 |
| A | | .78 | 4.5 |
| B | | .81 | 3.75 |
| C | | .83 | 2.35 |
| D | | .85 | 2.05 |
| E | | .88 | 1.10 |
| F | | .91 | 0 |

As shown in the table, catalytic activity decreases with increased sodium ion content from an unacceptable 55 dimer units of the starting material which has a $Na_2O/Al_2O_3$ ratio of about 0.6 to about zero dimer units as the $Na_2O/Al_2O_3$ ratio approaches 1. For an acceptable adsorbent it is preferred that the $Na_2O/Al_2O_3$ ratio of the final product be greater than about 0.70.

Ion exchange conditions should be so regulated to achieve this desired degree of ion exchange. The degree of ion exchange achieved is a function of the three variables of caustic and fluoride concentrations, temperature at which the ion exchange is conducted, and the length of time the ion exchange is continued.

The preferred fluoride-containing sodium hydroxide solution employed will be sodium hydroxide and sodium fluoride dissolved in water. Suitable concentrations to obtain the desired ion exchange can be from about 0.5 to 10 wt. % of sodium hydroxide with the preferred concentration being from about 0.5 to about 5 wt. % and from about 0.1 wt. % up to the solubility limit (about 5%) of sodium fluoride. By using solutions containing sodium hydroxide and sodium fluoride within these ranges of concentrations, the desired ion exchange can be obtained at temperatures from about 50°to 250°F. with temperatures from about 150°to 250°F. being especially preferred. Operating pressure is not critical and need only be sufficient to insure a liquid phase. Operating pressures can range from about atmospheric pressure to about 100 psig. The length of time required for the ion exchange will vary, depending upon the solution concentration and temperature, from about 0.5 to 5 hours. Within the above preferred concentrations and temperature ranges a contact time which has been shown to be especially preferred is about 2 to 3 hours. Continuous or batch-type operations can be employed. The ion exchange step should be controlled so that the zeolite structure will not be destroyed and so that the final product will have a $Na_2O/Al_2O_3$ ratio greater than about 0.7.

The next step in the method of manufacture of this invention is the washing step for the purpose of removing excess sodium hydroxide solution remaining within the ion-exchanged base material. The washing medium is water which has a pH within the range of 7 to 10 and preferably within the range of 9 to 10. If necessary, the water is adjusted to and maintained within the desired pH range by adding small quantities of acid or base. Since the primary purpose of the ion exchange was to remove hydrogen cation (and metal cation) contaminants which are thought to cause catalytic activity, this pH range is necessary to avoid redepositing hydrogen cation on the adsorbent mass. Washing temperatures can include temperatures within the range of about 50° F. to about 250° F. with a temperature of about 100° F. to 150° F. preferred. Although the washing step can be done in a batch manner with one aliquot of wash water at a time, the washing step can be done on a continuous flow type basis with water passed through a bed of the adsorbent at a given liquid hourly space velocity and a temperature for a period of time in order that from about 1 to about 5 gallons of water per pound of starting material is used to wash the material. Preferred continuous washing conditions include using liquid hourly space velocities from about 0.5 to about 5, with 1.5 being preferred, to pass from about 1 to about 3 gallons of wash water per pound of starting material over the ion exchanged adsorbent. A good indication of complete washing is made by measuring the pH of the effluent wash water and comparing it to the pH of the fresh feed wash water. When they are the same washing can generally be considered as complete.

When the wash step is completed the wet adsorbent particles will usually contain from about 30 to about 50 wt. % volatile matter (water) as measured by loss on ignition to 900° C. In this specification, the volatile matter content of the zeolitic adsorbent is determined by the weight difference obtained before and after drying a sample of adsorbent in a high temperature furnace at 900° C. under an inert purge gas stream such as nitrogen for a period of time sufficient to achieve a constant weight. The difference in weight, calculated as a percentage of sample's initial weight, is reported as loss on ignition (LOI) at 900° C. and represents the volatile matter present within the adsorbent. The remaining step in the method of manufacture then is the drying step to reduce the LOI at 900° C to less than about 10 wt. % with the preferred LOI being about 3 to 7 wt. %. After the washing has been completed, the particles are unloaded and dried in a force air oven at temperatures within the range of from about 100° F. to about 1,000° F. for a period of time sufficient to remove enough water so that the volatile matter content of the zeolite is below about 10 wt. %. Other methods of drying may be used which can include drying in the presence of an inert gas or under a vacuum, or both.

Since the aniticipated use of the adsorbent prepared by the method of this invention is in various processes for the separation of olefinic hydrocarbons from a feed mixture containing olefinic and saturated hydrocarbons, the particular usefulness of this adsorbent and general insight into its desirable characteristics may be better understood by brief reference to those processes.

Charge stocks which may be charged to selective adsorption processes employing the adsorbent produced by the method of my invention may contain olefins in the $C_4$–$C_{20}$ carbon range. Of these olefins, the $C_{10}$–$C_{15}$ normal mono-olefins are generally produced by catalytically dehydrogenating a $C_{10}$–$C_{15}$ normal paraffin stream. The effluent stream from a dehydrogenation process generally contains about 5 to 25% olefins and may require further processing in order to concentrate the normal olefinic hydrocarbons.

A typical example of the composition of the effluent stream from a dehydrogenation process is shown below in Table 2:

TABLE 2

DEHYDROGENATION REACTOR EFFLUENT ANALYSIS BY GAS-LIQUID CHROMATOGRAPHY

|  |  | WT. % |
|---|---|---|
| n-$C_{10}$ paraffins |  | 0.1 |
| n-$C_{11}$ paraffins |  | 24.9 |
| n-$C_{11}$ olefins |  | 1.8 |
| n-$C_{12}$ paraffins |  | 27.8 |
| n-$C_{12}$ olefins |  | 2.6 |
| n-$C_{13}$ paraffins |  | 22.6 |
| n-$C_{13}$ olefins |  | 2.7 |
| n-$C_{14}$ paraffins |  | 12.1 |
| n-$C_{14}$ olefins |  | 1.7 |
| n-$C_{15}$ paraffins |  | 0.4 |
| Total non-normals |  | 3.3 |
|  | TOTAL | 100.0 |
| Total non-normals |  | 8.8 |
| Total normal olefins |  | 87.9 |
| Total normal paraffins |  | 3.3 |
|  | TOTAL | 100.0 |
|  |  | VOL. % |
| Total olefins |  | 9.8 |
| Light ends |  | 0.2 |
| Total paraffins |  | 86.5 |
| Total non-normals |  | 3.5 |
|  | TOTAL | 100.0 |

The 3.5 volume percent non-normals in the above analysis are primarily aromatics. Another possible charge stock for the process would be a selected fraction from a gasoline produced by a fluid catalytic cracking unit. A typical analysis, from a 95° C. cut of such gasoline is as follows:

|  | VOL. % |
|---|---|
| Olefins | 25.4 |

-Continued

| Paraffins and naphthenes | 72.3 |
|---|---|
| Aromatics | 2.3 |
| TOTAL | 100.0 |

In separating the olefinic hydrocarbon from the feed mixture, the feed is contacted with a bed or beds of the adsorbent and the olefinic hydrocarbons are selectively retained by the adsorbent while the unadsorbed or raffinate mixture comprising saturated hydrocarbons is removed from the interstitial void spaces between the particles of adsorbent and the surface of the solid adsorbent. The adsorbent may then be contacted with a desorbent material which is capable of displacing the adsorbed olefin hydrocarbons from the adsorbent.

The adsorbent can be contained in one or more chambers where through programmed flow into and out of the chamber separation of the olefinic hydrocarbons is effected. A particularly preferred process to use the adsorbent of my invention employs the simulated moving-bed countercurrent operations similar to those disclosed in the pattern of operations in U.S. Pat. No. 2,985,589 and more specifically in U.S. Pat. No. 3,510,423. The preferred process for separating olefins from a feed mixture comprising olefins and saturates would comprise the steps of: contacting the feed mixture with the adsorbent at adsorption conditions to effect the selective retention of the olefins by the adsorbent, withdrawing from the bed of adsorbent a raffinate stream comprising less selectively adsorbed feed mixture components, contacting the adsorbent with a desorbent material at desorption conditions to effect desorption of the olefins from the adsorbent, and withdrawing a stream containing the olefins and desorbent from the adsorbent. The longer useful life of my adsorbent would be an improvement to such process as this one in which a regeneration step is not included in the normal sequence of operations.

Preferred operating conditions of this particular process include a temperature within the range of from about 70° F. to about 450° F. and a pressure within the range of from about atmospheric to about 500 psig. Furthermore, both adsorption and desorption of the olefins are effected at conditions selected to maintain liquid phase throughout the bed of adsorbent.

The adsorbent produced by the method of this invention may of course be used in other selective adsorption processes for separating olefins. This might include, for instance, swing-bed or moving bed processes in which both adsorption and desorption are conducted in the vapor phase or in which one operation is conducted in the vapor phase and the other in the liquid phase. Operating pressures and temperatures for adsorption and desorption might be the same or different.

The desorbents which can be used in processes employing this adsorbent will vary depending on the type of operation employed. In the swing bed system in which the preferably adsorbed olefins are removed from the adsorbent by a purge stream, gaseous hydrocarbons or other type gases may be used at elevated temperatures or reduced pressures or both to effectively purge adsorbed olefins from within the sorbent. However, in other type operations which are generally operated at substantially constant pressures and temperatures, the desorbent relied upon must be judiciously selected in order that it may displace the preferred olefin adsorbed from the feed within the adsorbent without duly preventing the feed olefins from displacing the desorbent in a following adsorption cycle.

Desorbents which can be used in the process of this invention should also be materials that are easily separable from the feed mixture that is passed into the process. In desorbing the preferentially adsorbed component of the feed both desorbent and the desorbed feed component are removed from the adsorbent in admixture. Without a method of separation in these two materials, the purity of the selectively adsorbed component of the feed stock would not be very high since it would be diluted with desorbent. It is contemplated that a desorbent having a different boiling range than the feed mixture used should be used in this process. The use of a desorbent of a different boiling range allows a simple separation by fractionation or other methods to remove desired feed components from the desorbent and allow reuse of the desorbent in the process. Specifically in processes employing substantially isothermal and isobaric liquid phase operations it is preferred to use a desorbent containing olefins or aromatics having a boiling range different than that of the feed mixture.

With the type of processes employing adsorbents to separate olefins now in mind, one can appreciate that certain characteristics of adsorbents are highly desirable, if not absolutely necessary, to the successful operation of the selective adsorptive process. Among such characteristics are: adsorptive capacity for some volume of desired olefins per volume of adsorbent; reduced or eliminated catalytic activity for undesired side reactions such as polymerization and isomerization; and selectivity of adsorption both for the desired carbon number range of olefins. Low or no initial dustiness of the adsorbent and attrition resistance are equally important to avoid possible pressure drop problems after the adsorbent has been loaded.

Capacity of the adsorbent for adsorbing a specific volume of olefins is of course a necessity; without such capacity the adsorbent is useless for adsorptive separation. Furthermore, the higher the adsorbent's capacity for the species to be adsorbed, the better is the adsorbent. Increased capacity of a particular adsorbent makes it possible to reduce the amount of adsorbent needed to separate the desired species contained in a particular rate of hydrocarbons feed mixture. A reduction in the amount of adsorbent required for a specific adsorptive separation reduces the cost of the separation process. It is important that the good initial capacity of the adsorbent be maintained during actual use in the separation process over some economically desirable life.

For this reason, and others, it is necessary that the adsorbent possess little or nor catalytic activity which would produce products that might degrade adsorbent capacity or selectivity. It is additionally important that the highly reactive olefins are not reacted into side products which either degrade the product quality or reduce the overall yield or concentrated olefins. In instances where the feed streams include both normal and isomeric olefin hydrocarbons which are to be separated and recovered together as a single product stream, the isomerization acitivity of the adsorbent is not a great impediment to the process ecomonics. Where, however, a specific olefin is desired as a product stream isomerization activity of the adsorbent is a prime consideration. In either case, reduction of polymerization acitivity is very important because of polymerization, in addition to reducing the yields of olefinic hydrocarbons also, as mentioned above, tends to degrade the adsorbent. The polymerization effects are generally considered to be primarily physical impediments which can prevent the olefinic hydrocarbons from passing into the molecular sieve adsorbent by plugging up the surface of the adsorbent. This shortens the useful life of the adsorbent and makes necessary frequent regeneration treatments to restore the adsorptive properties of the adsorbent.

Since both reactions seem to occur at the same time, the term "catalytic acitvity" as used herein shall mean both isomerization and polymerization acitivity. It is, therefore, extremely important that the catalytic activity be substantially reduced or preferably totally eliminated by proper methods of manufacture of a selected adsorbent.

While reducing the temperature of the operations of the adsorption process in which the catalytic acitivity is present will substantially reduce the catalytic activity because of the associated reduction in the rate of reaction, this procedure in adsorptive separation processes employing molecular sieves is, generally not desirable because the reduction in temperature also reduced the kinetic energy of the materials passing into and out of the adsorbent. This substantially reduces the rate of exchange of feed olefins into and out of the adsorbent giving what is considered in the art as poor breakthrough fronts which results in product contamination with feed stock and relatively high requirements of adsorbent for a given throughput of olefin-containing feed stock.

The other important adsorbent characteristic is the ability of the adsorbent to separate components of the feed; or, in other words, the selectivity, (B), of the adsorbent for one component as compared to another component. Selectivity is expressed not only for the desired hydrocarbon type (olefins) as compared to undesired hydrocarbons but is also expressed between homologs of the desired hydrocarbon type. The selectivity (B) as used throughout this specification is defined as the ratio of the two components of the adsorbed phase over the ratio of the same two components in the unadsorbed phase at equilibrium conditions.

Selectivity is shown as Equation 1 below:

Equation 1

$$\text{Selectivity} = (B) = \frac{[\text{vol. percent C/vol. percent D}]A}{[\text{vol. percent C/vol. percent D}]U}$$

where C and D are two components of the feed represented in volume percent and the subscripts A and U represent the adsorbed and unadsorbed phase respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectively by the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectively equal to about 1 or slightly less than 1.

The remaining important characteristic, not only for adsorbents but for catalysts as well, is low initial dustiness. This characteristic must of course be coupled with sufficient particle mechanical strength to resist subsequent dust formation during process usage. Such dust, whether present initially or developed later, may migrate within the adsorbent chamber or reaction vessel during process use to form flow restrictions from which excessive pressure drops can result. Such pressure drops grind up adsorbent or catalyst present in the chamber or vessel and can exceed equipment mechanical limitations thereby forcing premature process shutdowns. I have discovered that the dustiness characteristic of adsorbents can be eliminated by a fluoride treatment step in the manufacture of such adsorbents. Such a step could be incorporated in catalyst manufacturing procedures as well to eliminate the dustiness characteristic of any such catalyst.

The adsorbent produced by the method of this invention has good capacity and selectivity for olefins coupled with essentially no catalytic activity or dustiness thereby making it particularly effective for use in a process for the separation of olefins.

In order to test various adsorbents to measure the characteristics of adsorptive capacity, selectivity, and degree of catalytic activity, a dynamic testing apparatus was employed. The apparatus used consisted of an adsorbent chamber of approximately 40 cc. volume having inlet and outlet portions at opposite ends of the chamber. The chamber was contained within a temperature control means and, in addition, pressure control equipment was used to operate the chamber at a constant predetermined pressure. Attached to the outlet line of the chamber was chromotographic analysis equipment which was used to analyze the effluent stream leaving the adsorbent chamber.

The actual operations of the pulse test used to determine the adsorbent capacity were as follows: a feed mixture containing a tracer component for ease of chromatographic analysis and at least one adsorbable component in a dilute component was passed through the adsorbent bed until the effluent stream leaving the adsorbent chamber, as measured by the chromatograph, was essentially the same composition as the feed stream passing into the inlet of the sorbent chamber. Generally the adsorbable component used in the feed mixture was decene-1. This indicates that the sieve has reached equilibrium, that is, the adsorbent was no longer adsorbing materials from the external phase and that there was no longer a net transfer of the material between the adsorbed phase and the external phase.

A desorbent mixture, containing a tracer component and an adsorbable component different from that of the feed, in a diluent component, was then passed into the absorbent chamber at conditions to effect desorption of the previously adsorbed feed mixture component. Octene-1 was usually used as the adsorbable component in the desorbent mixture. The desorbent mixture was continuously passed into the adsorbent chamber until the effluent material, as monitored by the chromatographic equipment was substantially identical to the desorbent feed material, indicating that equilibrium conditions has been achieved. Knowing the flow rate to the chamber and the effluent composition as continuously monitored by the chromatograph, the total amount of the components adsorbed by the adsorbent from the desorbent mixture can be calculated.

In order to determine the adsorptive capacity of the sieve for components in the feed mixture, the inlet stream to the chamber was then switched from the desorbent mixture back to the feed mixture to allow feed components to displace the previously adsorbed components from the desorbent mixtures. Again using the traces developed by the chromatograph and knowing the flow rate the volume of feed components adsorbed can be calculated.

Selectivity can then be calculated using the previously mentioned equation for selectivity and the capacities determined above.

In measuring the polymerization activity of the adsorbent, the same gas chromatographic equipment and testing apparatus was used. Two variations of the polymerization test can be used. In the first variation, the degree of catalytic activity may be measured by the loss of a known concentration of feed olefin as detected in the effluent stream by the chromatographic equipment. The measure of polymerization is then an indirect determination, being related to the difference between the inlet and outlet olefin concentrations. This catalytic activity is thought to be primarily due to polymerization reactions of the feed olefins with a small part of the feed olefins that are isomerized to other internal olefinic isomers. The relative activity scale used to express the catalytic activity of the adsorbent is determined by measuring the peak height on the chromotograph equivalent to the inlet concentration of olefin as indicative of a zero catalytic activity. Hence, if the peak height of the olefins present in the effluent is the same as the peak height of a known concentration of olefins present in the feed the relative adsorbent activity is zero. An effluent peak height equal to one half that of the feed would represent exactly 50% polymerization of isomerization of the feed olefin component. The adsorbent activity would therefore be 50%. Equation 2 below represents the formula used to determine catalytic activity on an adsorbent knowing the peak height of the olefins remaining in the effluent stream leaving the adsorbent chamber and the peak height of the olefins present in the feed.

Equation 2

$$\text{Adsorbent Activity} = 100 - 100 \frac{(Pe)}{(Pf)}$$

where $Pe$ represents the peak height of the effluent olefins and $Pf$ represents the peak height of the feed olefins.

The second variation of the catalytic activity test is to measure the polymer formed directly in the effluent stream with the chromatographic equipment. This method depends upon selecting a feed olefin, such as di-isobutylene, that easily forms an identifiable polymer. The dimer peak height above the base line is then used as the measure of polymerization and catalytic activity is reported as dimer units. Both test variations can be used with the second method being the more sensitive in determining catalytic activity.

A comparison of the dust content of adsorbents was made by simply pouring 10 ml. of adsorbent into 40 ml. of methanol contained in a 25 × 95 mm 8 dram vial, mixing the contents, and observing or measuring the opacity of the methanol. The dust is dispersed in the alcohol and the degree of opacity serves as an index of the dust content. A specific dust test involved adding 10 ml. of adsorbent to 40 ml. of methanol in a vial and mixing the contents of the vial by rotation at 15 rpm for 5 minutes. A 10 ml. portion of liquid was then drawn off, diluted with 10 ml. of fresh methanol and a sample was placed in a 1 ml. measurement cell. Optical density measured at 400 nanometers was then determined and that determination served as an index of the adsorbent's dust content.

Confirming pulse, catalytic activity and dust test data required testing of the adsorbent in a continuous countercurrent liquid-solid contacting device to determine the adsorbent's actual performance in an olefin separation process.

The general operating principles of such a device have been previously described and are found in Broughton U.S. Pat. No. 2,985,589 and a specific laboratory-size apparatus utilizing these principles is described in deRosset, et al., U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on adsorbent testing and evaluation may be found in the paper "Separation of $C_8$ Aromatics by Adsorption" by A. J. deRosset, R. W. Neuzil, D. J. Korous and D. H. Rosback presented at the American Chemical Society, Los Angeles, Cal. Mar. 28–Apr. 2, 1971.

The superior performance indicated by pulse test and activity test data obtained on adsorbents prepared by the method of this invention was confirmed by continuous tesing in this device.

EXAMPLE

In this example three adsorbents were prepared from the same base material and tested to illustrate the desired properties achieved by the method of this invention.

The three adsorbents were prepared from base material comprising commercially available 13X zeolite in the form of nominal 1/16 × 1/8 - inch extrudate. This base material was ground to produce 20–40 U.S. Standard Mesh particle size material and divided into three portions from which three adsorbents, A, B, and C were prepared.

One portion of base material received no treatment with either sodium hydroxide alone or in combination with sodium fluoride and was tested as Adsorbent A.

A second portion was treated with a dilute solution of NaOH only and then water washed to produce Adsorbent B. A 200 cc. portion of the base material was batch treated for 2 hours at 90° C. with a solution of 20 g. NaOH dissolved in 500 ml. of deionized water. The material was then washed by decantation with five 500 ml. portions of water, two at 25° C., three at 50° C.

A third portion was treated with a solution containing both NaF and NaOH and then water washed to produce Adsorbent C. A 200 cc. portion of the base material was batch treated for 2 hours at 90° C. with a solution of 25 g. NaF and 20 g. NaOH dissolved in 500 ml. of deionized water. The material was batch washed in the manner described above.

All 3 adsorbents were dried for 16 hours at 185° C. with perfluent $N_2$ and then rehydrated to 4 wt. % water prior to being tested for performance by the pulse, activity and dustiness tests previously described.

The results of the testing for the three adsorbents are shown in Table 3 below.

Table 3

Capacity and Dustiness Test Data for Adsorbents

| Adsorbent | A | B | C |
|---|---|---|---|
| Treatment | none (base material) | NaOH | NaOH/NaF |
| Testing Data | | | |
| Catalytic Activity, Dimer Units | 55 | 2.8 | 0 |
| Dustiness by Optical Density | 1.4 | 0.7 | <0.1 |
| Capacity | | | |
| cc. of octene-1/40 cc. adsorbent | 3.1 | 3.3 | 3.3 |
| cc. of decene-1/40 cc. absorbent | 2.4 | 2.6 | 2.5 |

The higher olefin capacity shown for adsorbents B and C indicate that either the NaOH or the NaOH/NaF treatment increases olefin capacity. While the NaOH treatment alone significantly reduces catalytic activity and dustiness, the combination NaOH and NaF essentially eliminates both catalytic activity and dustiness. Thus the NaOH and NaF treatment produces an adsorbent with the best combination of characteristics.

I claim as my invention:

1. A method of manufacturing a solid adsorbent comprising the steps of:
   a. contacting a base material comprising X or Y zeolite with a fluoride-containing aqueous solution of sodium hydroxide at ion exchange conditions to effect the addition of sodium cations to and the extraction of alumina from said base material;
   b. washing the ion exchanged material at washing conditions until substantially free of sodium hydroxide;
   c. drying the adsorbent at drying conditions to reduce the LOI at 900° C. to less than about 10 wt. %.

2. The method of claim 1 further characterized in that said base material has a $Na_2O/Al_2O_3$ ratio of about 0.7 or less.

3. The method of claim 1 further characterized in that said solution contains sodium fluoride in a concentration of less than its solubility limit and sodium hydroxide in a concentration of from about 0.5 to about 10 wt. %.

4. The method of claim 1 further characterized in that said ion exchange conditions include a temperature within the range of from about 50° F. to about 250° F.

5. The method of claim 1 further characterized in that said sodium exchanged base material has a $Na_2O/Al_2O_3$ ratio greater than about 0.7.

6. The method of claim 1 further characterized in that said washing conditions include a pH sufficient to preclude formation of the hydrogen form of the zeolite, and a temperature within the range of from about 50° F. to about 250° F.

7. The method of claim 1 further characterized in that said drying conditions include a temperature within the range of from about 100° F. to about 1,000° F.

8. A method of manufacturing a solid adsorbent which method comprises the steps of:
   a. contacting a base material comprising X or Y structured zeolite having a $Na_2O/Al_2O_3$ ratio of about 0.7 or less with a fluoride-containing aqueous sodium hydroxide solution at ion exchange conditions to increase the sodium cation content of said mass to a $Na_2O/Al_2O_3$ ratio of greater than about 0.7 and extract alumina from said base material;
   b. washing the sodium-exchanged base material at washing conditions until substantially free of sodium hydroxide; and,
   c. drying the adsorbent at conditions sufficient to reduce the LOI at 900° C. to less than about 10 wt. %.

9. The method of claim 8 further characterized in that said solution contains fluoride in a concentration of less than its solubility limit and sodium hydroxide in a concentration of from about 0.5 to about 10 wt. %.

10. The method of claim 8 further characterized in that said ion exchange conditions include a temperature within the range of from about 50° F. to about 250° F.

11. The method of claim 8 further characterized in that said washing conditions include a pH sufficient to preclude formation of the hydrogen form of the zeolite, and a temperature within the range of from about 50° F. to about 250° F.

12. The method of claim 8 further characterized in that said drying conditions include a temperature within the range of from about 100° F. to about 1,000° F.

13. A solid adsorbent prepared by contacting a base material comprising X or Y structured zeolite with a fluoride-containing aqueous sodium hydroxide solution at ion exchange conditions to effect the addition of sodium cations to and the extraction of alumina from said base material, washing the sodium-exchange material at washing conditions until essentially free of sodium hydroxide and drying the adsorbent at conditions to reduce the LOI at 900° C. to less than about 10 wt. %.

* * * * *